United States Patent
Wu et al.

(10) Patent No.: US 7,744,296 B2
(45) Date of Patent: Jun. 29, 2010

(54) CAMERA MODULE HAVING COLLOID LAYER SURROUNDING SENSOR

(75) Inventors: He-Ming Wu, Taipei Hsien (TW); Fu-Chieh Chan, Taipei Hsien (TW); Shin-Wen Chen, Taipei Hsien (TW); Fu-Yen Tseng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 276 days.

(21) Appl. No.: 11/877,596

(22) Filed: Oct. 23, 2007

(65) Prior Publication Data
US 2008/0279547 A1 Nov. 13, 2008

(30) Foreign Application Priority Data
May 11, 2007 (CN) .................... 2007 1 0200601

(51) Int. Cl.
*G03B 17/02* (2006.01)
(52) U.S. Cl. .................... 396/529; 348/374; 438/121
(58) Field of Classification Search ................ 396/529
See application file for complete search history.

(56) References Cited

U.S. PATENT DOCUMENTS

| 6,011,661 | A * | 1/2000 | Weng ..................... 359/819 |
| 7,304,684 | B2 * | 12/2007 | Segawa et al. .............. 348/374 |
| 7,358,289 | B2 * | 4/2008 | Toriumi et al. .............. 524/272 |
| 7,422,382 | B2 * | 9/2008 | Seo ........................... 396/529 |
| 7,542,220 | B2 * | 6/2009 | Chan ......................... 359/811 |
| 2002/0057468 | A1 * | 5/2002 | Segawa et al. .............. 358/509 |
| 2005/0237419 | A1 * | 10/2005 | Van Gemert ................ 348/340 |
| 2006/0014871 | A1 * | 1/2006 | Toriumi et al. .............. 524/270 |
| 2006/0181633 | A1 * | 8/2006 | Seo ........................... 348/340 |
| 2007/0212061 | A1 * | 9/2007 | Woo .......................... 396/529 |

FOREIGN PATENT DOCUMENTS

| CN | 2668754 | 12/2004 |
| CN | 2785142 | 5/2006 |

OTHER PUBLICATIONS

"Filters for Digital Cameras", obtained from bobatkins.com via the Wayback Machine; http://web.archive.org/web/20060628124726/http://www.bobatkins.com/photography/tutorials/digital_filters.html, dated Jun. 28, 2006.*

* cited by examiner

*Primary Examiner*—W. B. Perkey
*Assistant Examiner*—Bret Adams
(74) *Attorney, Agent, or Firm*—Jeffrey T. Knapp

(57) ABSTRACT

A camera module (200) includes a lens module and a base (210) with a sensor installed thereon. The base is provided with at least two supporting protrusions (222) extending therefrom. Each protrusion is oriented the lens module, and the lens module is fixedly to and contacts with the at least two supporting protrusions. A colloid layer surrounding the sensor is sandwiched between the second end of the holder and the base. Electronic components are disposed on the circuit board and covered by the colloid layer.

15 Claims, 5 Drawing Sheets

CAMERA MODULE HAVING COLLOID LAYER SURROUNDING SENSOR

CROSS-REFERENCE TO RELATED APPLICATIONS

This application is related to a commonly-assigned copending application entitled, "Camera Module Assembly", filed on Apr. 9, 2007 (U.S. application Ser. No. 11/836,733). Disclosure of the above identified application is incorporated herein by reference.

BACKGROUND

1. Field of the Invention

The present invention relates to camera modules and, particularly, to a compact camera module and a method for assembling the same.

2. Description of Related Art

Nowadays, camera modules are in widespread use. Camera modules are being combined with various portable electronic devices such as mobile phones, PDAs (personal digital assistants) and computers to be increasingly multi-functional. Furthermore, such camera modules also need to satisfy requirements of compactness, low cost, and excellent optical performance. However, due to narrow space in the camera modules, the requirements are hard to achieve.

Referring to FIGS. 4 and 5, a typical camera module 100 is shown. The camera module 100 includes a lens barrel 102, a holder 104, an image sensor 106, a glass plate 108 and a circuit board 110. The lens barrel 102 has threads 112 defined on an outer wall thereof. The holder 104 has a cavity 114 therein and threads 116 defined on an inner wall thereof. The lens barrel 102 is engaged with the inner wall of the holder 104 by threads. The image sensor 106 is attached to and electrically connected to the circuit board 110. The image sensor 106 is exposed to light. The glass plate 108 covers the image sensor 106. The holder 104 is coupled to the circuit board 110 so as to house the image sensor 106. In this way, the image sensor 106 is protected from dust.

Generally, during assembly of the camera module 100, the holder 104 is attached to the circuit board 110. Therefore, additional surface area of the circuit board 110 has been needed to facilitate sufficient bonding area with the holder 104. This use of valuable circuit board surface has effectively required a larger circuit board 110 to be used, ultimately increasing both the size and cost of the camera module.

What is needed, therefore, is to provide a camera module with requirements of compactness and low cost.

SUMMARY

In a present embodiment, a camera module includes a lens module and a base. The base is provided with at least two supporting protrusions extending therefrom. Each protrusion is oriented the lens module and integrally formed with the base. The lens module is supported on and fixedly contacting with the at least two supporting protrusions. A colloid layer surrounding the sensor is sandwiched between the second end of the holder. Electrical elements are disposed on the circuit board and covered by the colloid layer.

Advantages and novel features will become more apparent from the following detailed description of the present camera module and its related assembling method, when taken in conjunction with the accompanying drawings.

BRIEF DESCRIPTION OF THE DRAWINGS

Many aspects of the present camera module and its related assembling method can be better understood with reference to the following drawings. The components in the drawings are not necessarily drawn to scale, the emphasis instead being placed upon clearly illustrating the principles of the present camera module and its related assembling method. Moreover, in the drawings, like reference numerals designate corresponding parts throughout the several views.

Figure 1:
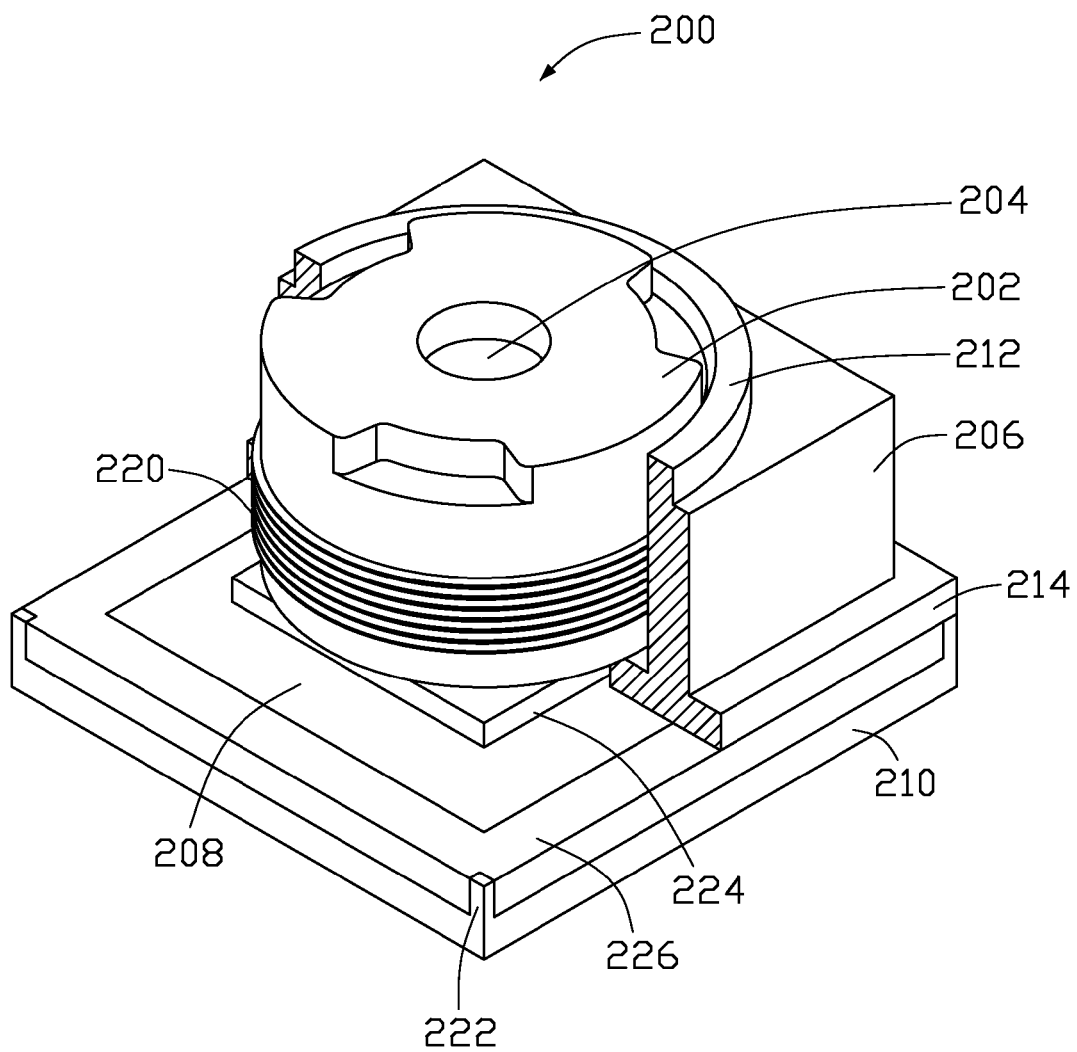
FIG. 1 is a cut-away view of a camera module according to a first present embodiment.

Corresponding reference characters indicate corresponding parts throughout the drawings. The exemplifications set out herein illustrate at least one preferred embodiment of the present camera module and its related assembling method, in one form, and such exemplifications are not to be construed as limiting the scope of the invention in any manner.

DETAILED DESCRIPTION OF THE INVENTION

Reference will now be made to the drawings to describe at least on preferred embodiments of the camera module and its related assembling method.

Figure 2:
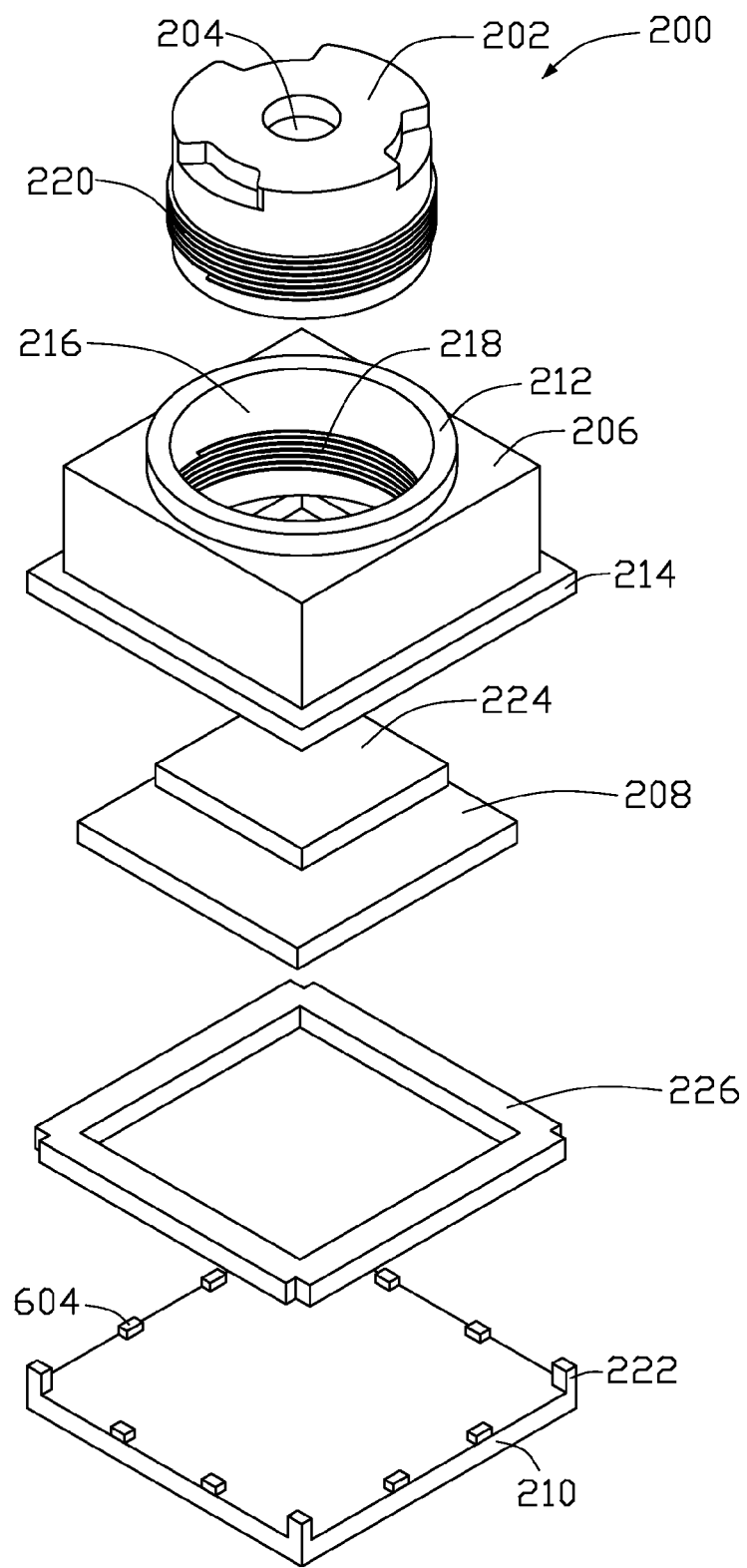
FIG. 2 is an exploded perspective view of the camera module shown in FIG. 1.

Referring to FIGS. 1 and 2, a camera module 200, according to a first present embodiment, is shown. The camera module 200 includes a lens module, a base 210 and a sensor 208. The lens module includes a lens barrel 202, at least one lens 204, and a holder 206. The sensor 208 is attached to the base 210 and is exposed to light traveling through the at least one lens 204. In this present embodiment, the base 210 is a circuit board electrically connected to the sensor 208. The sensor 208 is, usually a CCD (coupled-charge device) sensor or a CMOS (complementary metal-oxide semiconductor) sensor.

The at least one lens 204 is received in the lens barrel 202. The material of the at least one lens 204 is, advantageously, an optical glass or plastic. The holder 206 has a first end 212 and a second end 214 and has a cavity 216 defined therein. The cavity 216 extends through the first end 212 and the second end 214.

The first end 212 has threads 218 defined on an inner wall thereof, and the lens barrel 202 has threads 220 defined on an outer wall thereof. Accordingly, the lens barrel 202 is engaged with the inner wall of the first end 212 by threading.

The base 210 is provided with at least two supporting protrusions 222 extending integrally/directly therefrom, along a direction pointing/oriented the second end 214 of the holder 206. Beneficially, the protrusion extension direction is parallel to the optical axis of the lens 204. In this present embodiment, the number of the supporting protrusions 222 is four. The base 210 is square and the four supporting protrusions 222 are respectively located on/at the four corners of the base 210. The second end 214 of the holder 206 is supported on the supporting protrusions 222 and fixed to the four supporting protrusions 222, with the aid of an adhesive or another attachment/bonding means. Therefore, the holder 206 is attached to the base 210 by the four supporting protrusions 222. Alternatively, the second end 214 of the holder 206 and the four supporting protrusions 222 may be configured such that the protrusions 222 are respectively matingly and fittingly received within the corners of the second end 214 of the holder 206 and are shaped so as to complete the square shape of the second end 214 of the holder 206. By actually being received in the corners of the second end 214 of the holder 206 in this manner, the protrusions 222 further aid in maintaining the alignment of the holder 206 relative to the base 210.

In this present embodiment, the four supporting protrusions 222 are integrally formed with the base 210. Alternately, the four supporting protrusions 222 may be separately formed from the base 210 and attached to the base 210 by adhesive, welding (e.g., plastic welding), or other attaching method. All of the supporting protrusions 222 are, usefully, of essentially identical height to promote even loading thereon. A cross sectional shape of the four supporting protrusions 222 is selected from the group comprised of square, rectangular, triangular, at least partially circular/arcuate (as shown in FIGS. 1 and 2). Advantageously, the portion of a given protrusion 222 that is to be positioned adjacent a corresponding corner of the second end 214 of the holder 206 is particularly configured/shaped to matingly fit with such corresponding corner.

A transparent component 224, such as an infrared filter, is provided between the sensor 208 and the lens barrel 202 and is configured for protecting an exposure area of the sensor 208 and filtering light from the at least one lens 204. Opportunely, the transparent component 224 is directly attached to the sensor 208. Alternately, the transparent component 224 may be fixed to an inner wall of the second end 214 of the holder 206. The transparent component 224 can be an optical glass plate or other such transparent element.

A colloid layer 226 is advantageously provided between the holder 206 and the base 210, so as to surround the sensor 208. Rather appropriately, the colloid layer 226 is a thermosetting adhesive. The effect of the colloid layer 226 is to protect the electrical elements including the sensor 208 on the base 210 (i.e., the colloid layer 226 acts an environmental seal, reducing the opportunity for contamination of the electrical elements.

It is to be understood that the area of the base 210 that is adjacent to/in contact with the colloid layer 226 can still be used for circuitry purposes, thus maximizing the available base area for such purposes. Referring to FIG. 2 again, a plurality of electrical elements 604 are provided on the area of the base 210 that is adjacent to/in contact with the colloid layer 226. The colloid layer 226 may cover the plurality of electrical elements 604 due to a flexibility of the colloid layer 226. Thus, the electrical elements 604 are disposed below the holder 206 and do not need to occupy additional surface space, outside of the holder 206, of the base 210. Therefore, the surface area of the base 210 is effectively used and the smaller sized base 210 compared with the prior art can be used to make an operable camera module 200.

Figure 3:
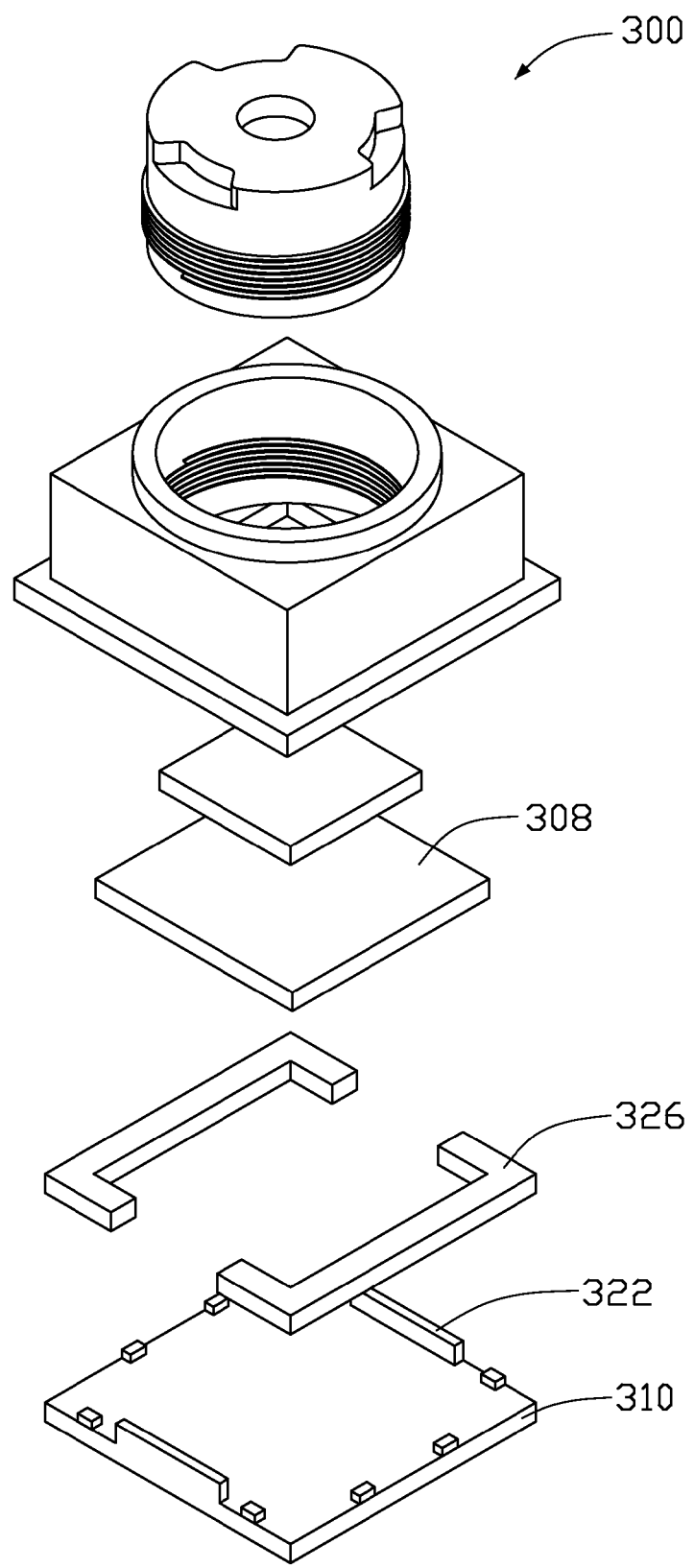
FIG. 3 is an exploded perspective view of a camera module according to a second present embodiment.
Figure 4:
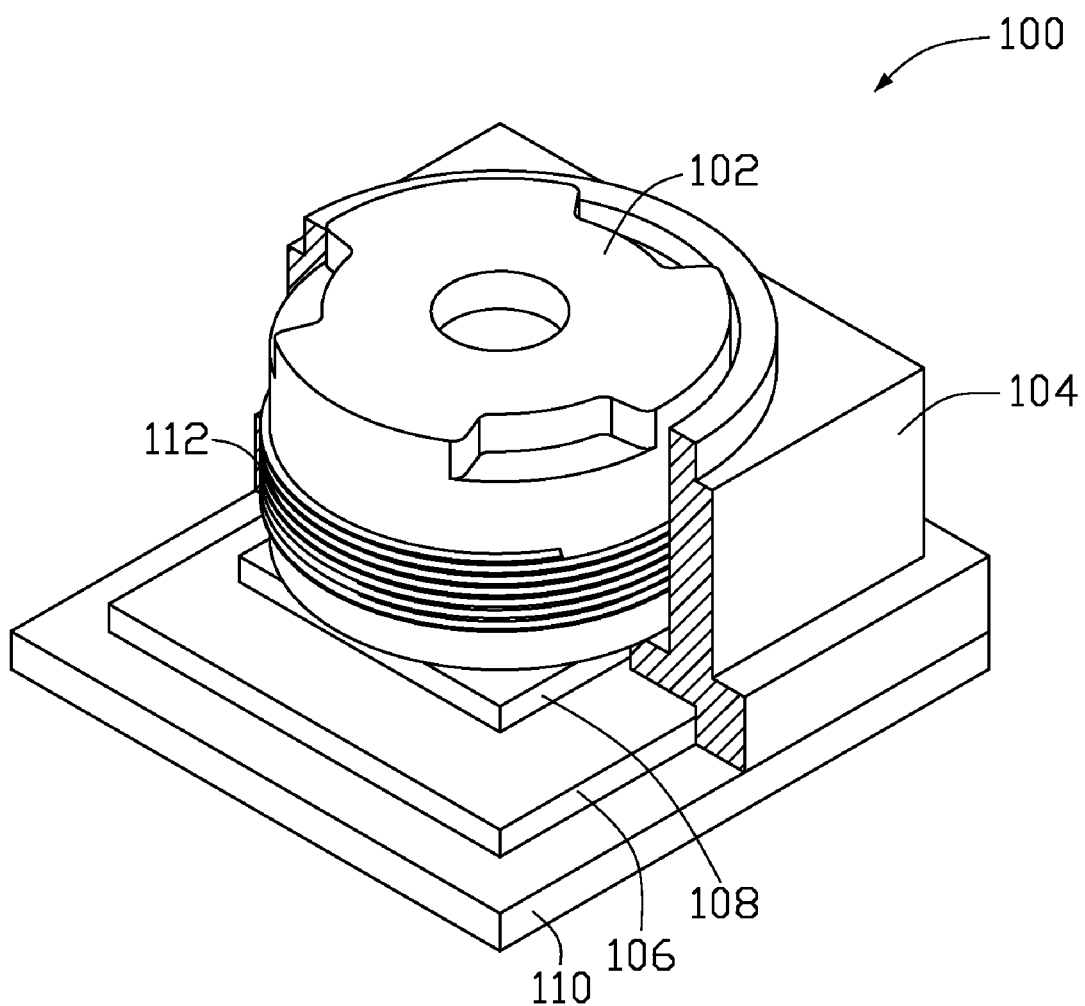
FIG. 4 is a cut-away view of a typical camera module.
Figure 5:
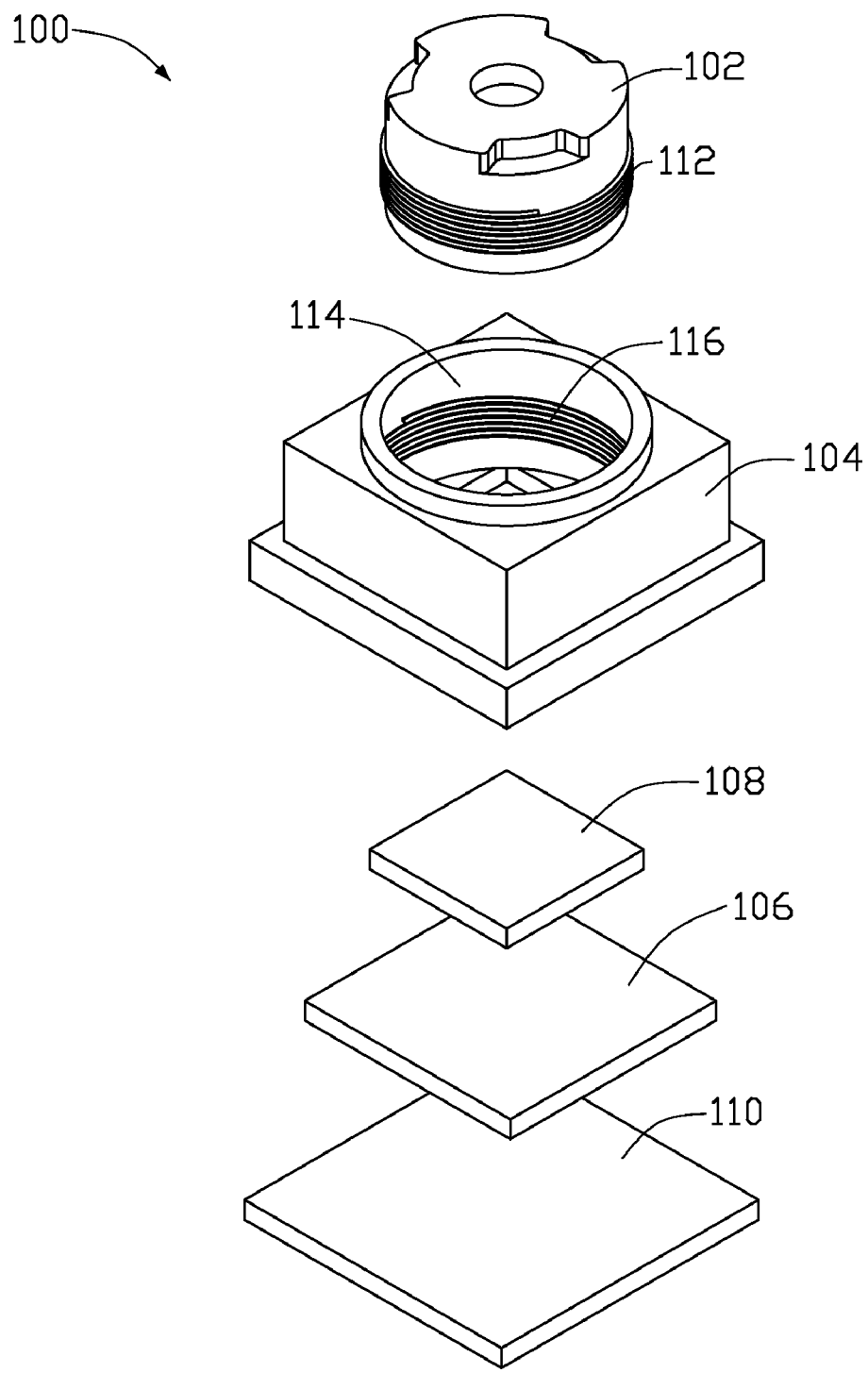
FIG. 5 is an exploded perspective view of the camera module shown in FIG. 4.

Referring to FIG. 3, a camera module 300, according to a second present embodiment, is shown. Differences between the camera module 300 of the second present embodiment and the camera module 200 of the first present embodiment are that the number of the support protrusions 322 in the camera module 300 is two and are respectively located on two opposite edges of the base 310. Each supporting protrusion 322 is a rectangular parallelepiped in shape, with essentially identical height. A length of each protrusion 322 is less than that of the corresponding edge of the base 310. A pair of square-bracket-shaped colloid layer elements 326 is provided, one on either respective side of the pair of protrusions 322, in order to protect the sensor 308.

Since the base is provided with at least two supporting protrusions, when attaching the holder to the base, such as a circuit board, the holder is attached to the base by the at least two supporting protrusions. Thus, some area of the base below the holder excluding the two supporting protrusions may be used to install other electronic components thereon. Therefore, the surface area of the base is reduced. This complies with the requirements for compactness and reduced expense.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A camera module comprising:
a lens module;
a base provided with at least two supporting protrusions extending therefrom, each protrusion oriented toward the lens module and integrally formed with the base, each protrusion comprising a top supporting surface, and the lens module being fixedly supported on and contacting with the top supporting surface of each of the at least two supporting protrusions;
a sensor directly attached to the base; and
a colloid layer surrounding the sensor, wherein the colloid layer is sandwiched between the lens module and the base.

2. The camera module as claimed in claim 1, wherein the at least two supporting protrusions and the base are separately formed and then assembled together.

3. The camera module as claimed in claim 1, wherein the lens module comprises:
a lens barrel;
at least one lens received in the lens barrel; and
a holder having a first end for holding the lens barrel and an opposite second end, the holder defining a cavity therein, the cavity extending through the first end and the second end, and the second end of the holder being attached to the base by fixedly contacting with the at least two supporting protrusions.

4. The camera module as claimed in claim 3, wherein the first end has threads defined on an inner wall thereof, and the lens barrel has threads defined on an outer wall thereof, and the lens barrel thereby threadedly engages with the inner wall of the first end of the holder.

5. The camera module as claimed in claim 3, further comprising a transparent component provided between the sensor and the lens barrel.

6. The camera module as claimed in claim 5, wherein the transparent component is an infrared filter attached to the sensor.

7. The camera module as claimed in claim 5, wherein the transparent component is a glass plate attached to the sensor.

8. The camera module as claimed in claim 5, wherein the transparent component is an infrared filter fixed to an inner wall of the second end of the holder.

9. The camera module as claimed in claim 3, wherein the colloid layer is sandwiched between the second end of the holder and the base.

10. The camera module as claimed in claim 9, wherein the colloid layer is a thermosetting adhesive.

11. The camera module as claimed in claim 1, wherein a cross sectional shape of the at least two supporting protrusions is selected from the group comprised of square, rectangular, triangular, at least partially circular/arcuate.

12. A camera module comprising:
a circuit board provided with at least two supporting protrusions extending therefrom;
a sensor attached on the circuit board;
a colloid layer attached on the circuit board with the supporting protrusions extending through the colloid layer in a direction perpendicular to the circuit board, wherein the colloid layer surrounds the sensor; and
a lens module comprising a lens barrel, at least one lens received in the lens barrel and aligned with the sensor, and a holder having a first end for holding the lens barrel and an opposite second end being fixedly attached to the at least two supporting protrusions and cooperating with the circuit board to sandwich the colloid layer therebetween.

13. The camera module as claimed in claim 12, wherein a plurality of electronic components is disposed on the circuit board and covered by the colloid layer.

14. The camera module as claimed in claim 13, wherein the circuit board is rectangular, the at least two supporting protrusions are formed at corners of the circuit board, the colloid layer is rectangular and defines at least two openings at corners thereof, the at least two supporting protrusions extending through the at least two openings to contact with the opposite second end of the holder.

15. The camera module as claimed in claim 13, wherein the circuit board is rectangular, the at least two supporting protrusions are rectangular parallelepiped in shape and disposed at opposite sides of the circuit board, the colloid layer is rectangular and defines at least two openings thereof, the at least two supporting protrusions extending through the at least two openings to contact with the opposite second end of the holder.

* * * * *